No. 791,307. PATENTED MAY 30, 1905.
C. L. WILKINS.
WATER MOTOR.
APPLICATION FILED JUNE 22, 1901.

2 SHEETS—SHEET 1.

WITNESSES:
H. B. Bradshaw
A. L. Phelps

INVENTOR
Charles L. Wilkins
BY
C. C. Shepherd
ATTORNEY

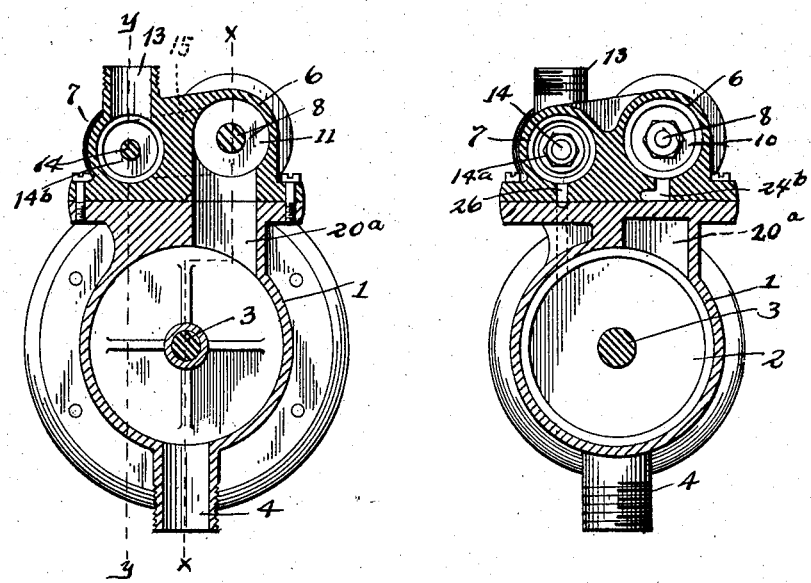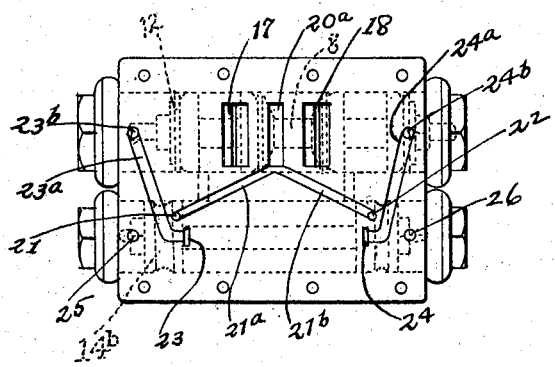

No. 791,307.

Patented May 30, 1905.

UNITED STATES PATENT OFFICE.

CHARLES L. WILKINS, OF COLUMBUS, OHIO, ASSIGNOR TO THE OHIO PUMP AND BRASS COMPANY, OF COLUMBUS, OHIO, A CORPORATION OF OHIO.

WATER-MOTOR.

SPECIFICATION forming part of Letters Patent No. 791,307, dated May 30, 1905.

Application filed June 22, 1901. Serial No. 65,612.

*To all whom it may concern:*

Be it known that I, CHARLES L. WILKINS, a citizen of the United States, residing at Columbus, in the county of Franklin and State of Ohio, have invented a certain new and useful Improvement in Water-Motors, of which the following is a specification.

My invention relates to the improvement of water-motors; and the objects of my inven10 tion are to provide a simple and reliable construction of water-motor whereby a steady and positive operation of the working parts is attained, to provide in connection therewith an improved arrangement and construction of valves, to so construct my improved motor as to insure the generation of desired power, and to produce other improvements the details of which will be more fully pointed out hereinafter. These objects I accomplish in the man20 ner illustrated in the accompanying drawings, in which—

Figure 1:
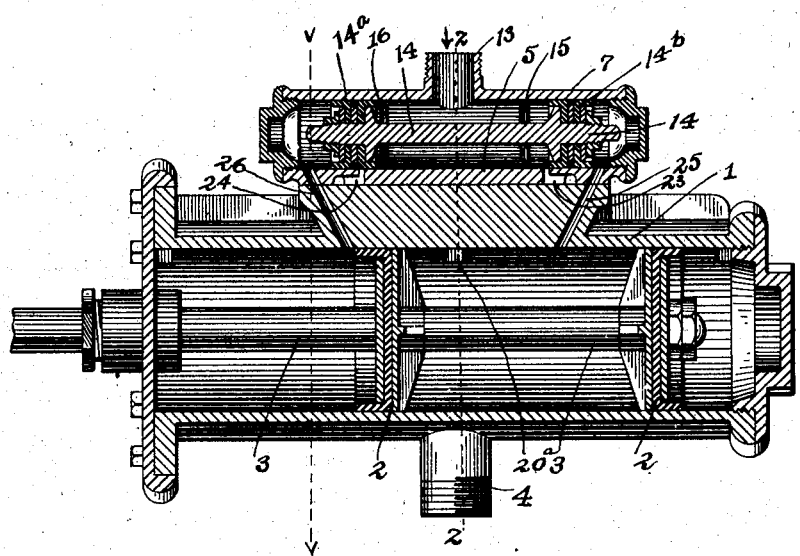
Figure 2:
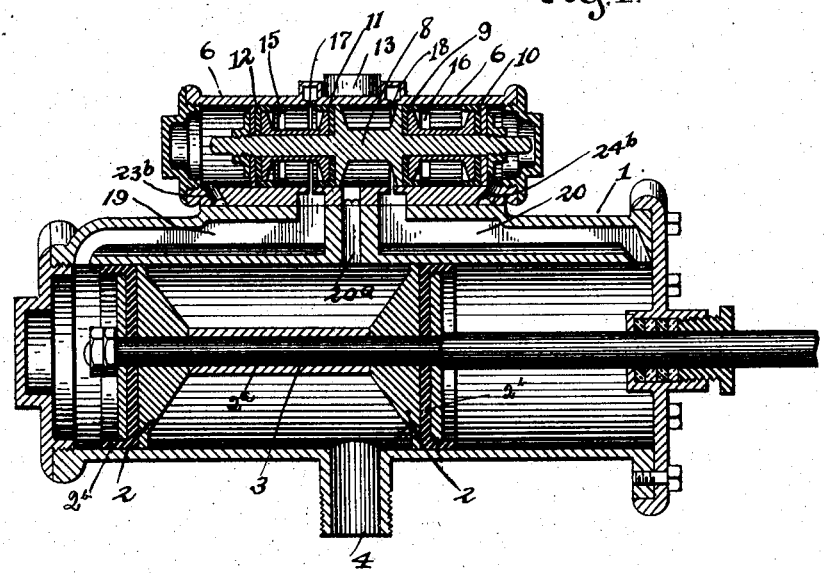

Figure 1 is a longitudinal section on line *y y* of Fig. 3. Fig. 2 is a longitudinal section on two planes, as indicated by dotted line *x x* of Fig. 3. Fig. 3 is a transverse section on line *z z* of Fig. 1. Fig. 4 is a similar view on line *v v* of Fig. 1. Fig. 5 is an under side view of the valve-casing body, and Fig. 6 is a detail view in elevation of one of the supple30 mental-valve cup-leathers.

Similar numerals refer to similar parts throughout the several views.

In carrying out my invention I employ a horizontally-arranged main cylinder 1, within which is arranged to slide the separated heads 2 of a piston-rod 3, which extends outward through one end of said cylinder. The heads 2 comprise, respectively, the spool $2^a$, having the two oppositely-arranged cups $2^b$ held in place upon the outer face of the ends of the spool in any desired manner. The cylinder 1 is provided in its lower portion with a central exhaust-outlet 4. Surmounting the main cylinder-body 1 is a valve-cylinder-casing body 5, in which are formed parallel valve-cylinders 6 and 7, the former being referred to hereinafter as the "main" valve-cylinder and the latter as a "supplemental" valve-cylinder. Within the main valve-cylinder I provide a horizontally-movable valve-body 8. On each side of the center of the length of this valve-body 8 is carried two valve-heads or cup-leathers, those to the right being indicated, respectively, by 9 and 10 and those to the left by the numerals 11 and 12. The supplemental valve-cylinder 7 is provided at the center of its length with a water-inlet 13, and within said cylinder 7 is provided a supplemental valve-body 14, which carries on its opposite ends heads or cup-leathers $14^a$ and $14^b$. The cylinders 6 and 7 communicate through the medium of ports 15 and 16. These ports are arranged, as shown, to connect the space between the heads $14^a$ and $14^b$ of the supplemental valve and the spaces between the heads 11 and 12 and 9 and 10 of the main valve 8. I also provide the main valve-cylinder on the inner sides of the ports 15 and 16 and on opposite sides of the center of the length of said cylinder with ports 17 and 18, which in their lower portions connect with water-passages 19 and 20, formed in the upper side of the cylinder 1, and which lead to opposite ends of said cylinder. The space between the inner heads or cup-leathers 9 and 11 communicates with the interior of the cylinder 1 and the space between the heads 2 through a downwardly-extending exhaust-port $20^a$. Leading downward from the supplemental valve-cylinder 7 are ports 21 and 22, which connect, respectively, with converging grooves $21^a$ and $21^b$ in the under side of the valve-casing body, these grooves leading to the exhaust-port $20^a$. Also leading downward from the supplemental valve-cylinder on opposite sides of the center of the length thereof are ports 23 and 24, which through the medium of grooves or water-passages $23^a$ and $24^a$ connect, respectively, with ports $23^b$ and $24^b$, which lead into opposite ends of the main valve-cylinder 6. 25 and 26 represent, respectively, ports which lead from the opposite ends of the supplemental valve-cylinder to the main or power cylinder 1, said ports leading into the latter on opposite sides of the center of the length thereof.

The operation of my improved motor is as follows: Water under pressure from a city supply-pipe enters the inlet 13 of the supplemental valve-cylinder 7, passing from the latter through the ports 15 and 16 into the spaces or chambers between the cup-leathers 9 and 10 and 11 and 12. Assuming now that the space between the cup-leathers 11 and 12 is in communication, through the port 17, with the passage 19 and that the valve 8 is so moved that the space between the cup-leathers 9 and 10 is out of communication with the port 18, the live water which enters the cylinder 6 through the port 15 will travel through the passage 19 to one end of the cylinder 1, where it will exert such pressure on the piston 3 as to drive the latter toward the opposite end of the cylinder 1. Water which may be contained in front of the forward piston-head 2 during such traveling movement will be forced upward through the passage 20 and port 18 into the space between the inner-valve cup-leathers 9 and 11, from which it will be permitted to escape through the outlet-port $20^a$ into the space between the piston-heads 2, thence outward through the exhaust-outlet 4. In the movement above described of the piston 3 the port 25 will be uncovered, resulting in the live water which is exerting a pressure on one of the piston-heads 2 being allowed to pass upward through said port 25 into one end of the supplemental valve-cylinder 7, where through pressure on the head $14^b$ the valve 14 will be moved toward the opposite end of said cylinder 7. In this movement of the valve 14 the port 23 will be closed by the valve-head $14^b$ and the port 24 opened to communication with the space between the heads $14^a$ and $14^b$.

In the construction of each of the valve-heads $14^a$ and $14^b$ the central disk of each of said cup-leathers, which is indicated more clearly in Fig. 6 of the drawings at $14^c$, is formed with a peripheral groove, this grooved disk being embraced between cup-leathers and being of such width as to permit of both the ports 21 and 23 (or the ports 22 and 24) being brought into communication with said groove. The points at which these ports lead into the supplemental cylinder are so arranged with reference to each other that in the movement of the valve-head toward the end of said cylinder said head has its central portion first brought into communication with the port 23 (or port 24) and then with the port 21, (or 22,) allowing the dead water from the end of the main valve-cylinder to exhaust through port 21 and passage $21^a$.

The valve 14 having been moved as above described, the live water from the cylinder 7 passes through the port 24 and passages $24^a$ and $24^b$ into that end of the main valve-cylinder 6 toward which the valve 8 has previously been forced, thus resulting in the valve 8 being moved to the opposite end of said cylinder. In the movement above described of the piston 14 the grooved central disk $14^c$ of the head $14^b$ is brought into communication with the ports 23 and 21, thus allowing the water in that end of the cylinder 6 toward which the valve 8 is moving to escape through the ports $23^b$, $23^a$, 23, 21, and $21^a$ to the exhaust-port $20^a$. Owing to the relative positions of the ports 21 and 23 or 22 and 24, it is obvious that when either the port 24 or port 23 is employed for the purpose of delivering live water to the end of the valve-cylinder 6 the port 22 or 21 would be closed.

It will be understood that the spaces between the heads 9 10 and 11 12 will at all times contain live water, and in the last-described movement of the valve 8 it is obvious that the water which enters the cylinder 6 from the port 16 will be directed through the passage 20 into one end of the cylinder 1, where it will operate to drive the piston 3 in the opposite direction from that thereinbefore described, while the water in front of said piston will be exhausted through the passage 19, port $20^a$, and outlet 4.

The operation above described being continued, it is obvious that a desirable uniform reciprocating motion is imparted to the piston 3.

Having now fully described my invention, what I claim, and desire to secure by Letters Patent, is—

1. In a water-motor, the combination with a cylinder and connected pistons located therein and spaced apart, a main valve for controlling the entrance of water to and its exit from the respective ends of the cylinder, an exhaust-duct opening out of the cylinder at a point between the connected pistons, a duct for directing the exhaust from the ends of the cylinder to a point in the cylinder between the connected pistons, an auxiliary valve for controlling the main valve, said auxiliary valve having grooved heads, ducts extending from the main cylinder to the ends of the chamber of the auxiliary valve, ducts communicating with the exhaust-duct and with the chamber of the auxiliary valve near the ends of the latter and ducts connecting the chamber of the auxiliary valve with the ends of the chamber of the main valve, said ducts having ports to be connected by the grooves of the auxiliary valve-heads.

2. In a water-motor, the combination with a cylinder and a piston therein, of two valve-chambers, a main valve having four heads in one of said chambers, an auxiliary valve having two heads in the other valve-chamber, means for conducting motive fluid to the auxiliary valve-chamber between the pistons of the auxiliary valve, ducts for conducting motive fluid from the auxiliary valve-chamber to the main valve-chamber between each two of the valve-heads therein, ducts connecting the main valve-chamber with the ends of the motor-cylinder, ducts connecting the motor-cylinder with the ends of the auxiliary valve-cylinder, ducts connecting the ends of the main valve-cylinder with the auxiliary valve-chamber, an exhaust-port and ducts connecting the auxiliary valve-chamber with the exhaust-port, the outer ends of said ducts being controlled by heads of the auxiliary valve.

3. In a water-motor, the combination with a cylinder and piston therein, of two valve-chambers, a main valve in one valve-chamber and an auxiliary valve in the other valve-chamber, ducts connecting the respective ends of the auxiliary valve-chamber with the cylinder, ducts connecting the intermediate portion of the auxiliary chamber with the main valve-chamber, ducts connecting the main valve-chamber with the auxiliary valve-chamber and controlled by said auxiliary valve, an exhaust-port, and outwardly-extending ducts controlled by the auxiliary valve and connecting the auxiliary valve-chamber with said exhaust-port.

4. In a water-motor, the combination with a cylinder and pistons therein, of a main valve for controlling the entrance to and exit of water from the cylinder, an auxiliary valve for controlling the main valve, the pistons of the auxiliary valve having grooves, an exhaust-port, outwardly-extending ducts communicating with the exhaust-port and adapted to communicate with said grooves, ducts communicating with the main valve-cylinder and also adapted to communicate with the grooves of the auxiliary valve, ducts connecting the chamber of the auxiliary valve with the motor-cylinder and ducts controlled by the main valve for conducting exhaust from the ends of the motor-cylinder to the same exhaust-port.

CHARLES L. WILKINS.

In presence of—
A. L. PHELPS,
W. L. MORROW.